Nov. 18, 1969  A. J. DE PIETRO  3,478,431
HINGE JOINT FOR DENTAL ARTICULATOR
Original Filed April 22, 1968  6 Sheets-Sheet 1

INVENTOR.
ANTHONY J. DE PIETRO
BY Louis V. Schiavo
ATTORNEY.

INVENTOR.
ANTHONY J. DE PIETRO
BY Louis V. Schiavo
ATTORNEY

Nov. 18, 1969  A. J. DE PIETRO  3,478,431
HINGE JOINT FOR DENTAL ARTICULATOR
Original Filed April 22, 1968  6 Sheets-Sheet 4

Fig. 12

INVENTOR.
ANTHONY J. DE PIETRO
BY Louis V Schiavo
ATTORNEY.

INVENTOR.
ANTHONY J. DE PIETRO

BY Louis V Schiavo

ATTORNEY.

United States Patent Office 3,478,431
Patented Nov. 18, 1969

3,478,431
HINGE JOINT FOR DENTAL ARTICULATOR
Anthony J. De Pietro, 208 School Lane,
Springfield, Pa. 19063
Continuation of application Ser. No. 729,868, Apr. 22, 1968, and a continuation-in-part of application Ser. No. 570,327, Aug. 4, 1966. This application Dec. 31, 1968, Ser. No. 789,658
Int. Cl. A61c 11/00
U.S. Cl. 32—32                                                    20 Claims

ABSTRACT OF THE DISCLOSURE

A hinge-type joint for a dental articulator is provided with a hinge part in the form of a spherical element carried by the lower bow member and a hinge part carried by the upper bow member including means providing a condylar guide surface seated upon the spherical element and an abutment surface engaging the side of the spherical element. The abutment surface and the posterior part of the condylar guide surface may be adjustably fixed relative to the anterior part of the condylar guide surface.

CROSS-REFERENCES TO RELATED APPLICATIONS

This application is a continuation-in-part of co-pending application, Ser. No. 570,327, filed Aug. 4, 1966 and now abandoned and a continuation of copending application, Ser. No. 729,868 filed Apr. 22, 1968, and now abandoned.

BACKGROUND OF THE INVENTION

Field of the invention

In my Patent No. 3,019,530, issued Feb. 6, 1962, I describe a certain hinge-type joint for a dental articulator, and in my Patent No. 3,176,400, issued Apr. 6, 1965, I describe an improved hinge-type joint. This application is addressed to further improvements in such joints.

Description of the prior art

In each of said patents, a hinge joint of the articulator includes a spherical element and a disc disposed in an upright position and undercut to provide a curvilinear guide surface seated upon the top of the spherical element and a depending abutment having a surface engaging the side of the spherical element. The condylar guide surface in its entirety is fixed relative to the abutment surface, as a consequence of which simulation of the movements of a patient's jaws with the desired degree of accuracy is precluded. For utmost accuracy, a certain degree of flexibility is required in positioning the abutment surface relative to the condylar guide surface, or better still the abutment surface and the posterior portion of the condylar guide surface relative to the anterior portion of the condylar guide surface.

SUMMARY

In one embodiment of the invention, the hinge part carried by the upper bow member is provided with an abutment surface and a condylar guide surface adjustably fixed relative to each other. In another embodiment of the invention, the hinge part carried by the upper bow member is provided with an abutment surface and a posterior portion of the condylar guide surface adjustably fixed relative to the anterior portion of the condylar guide surface.

The hinge joints of the aforementioned patents, it will be observed, would be comparatively expensive to manufacture due to the amount of machinery necessary to fabricate the several parts thereof, in consequence of which an important object of this invention is to provide a hinge joint which, while providing the advantages indicated hereinabove, is materially simpler in design and less expensive to manufacture.

Other objects of the invention will become apparent when the following description is read with reference to the accompanying drawings, in which:

The following description is directed to the specific forms of the invention shown in the drawings. It is not addressed to the scope of the invention, which may be practiced in a wider variety of forms.

Figure 1:
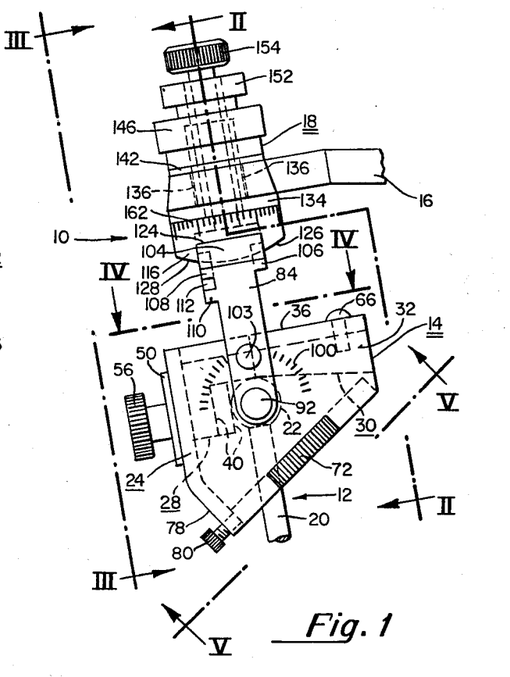
FIGURE 1 is a side view of a hinge joint constructed in accordance with the invention.
Figure 2:
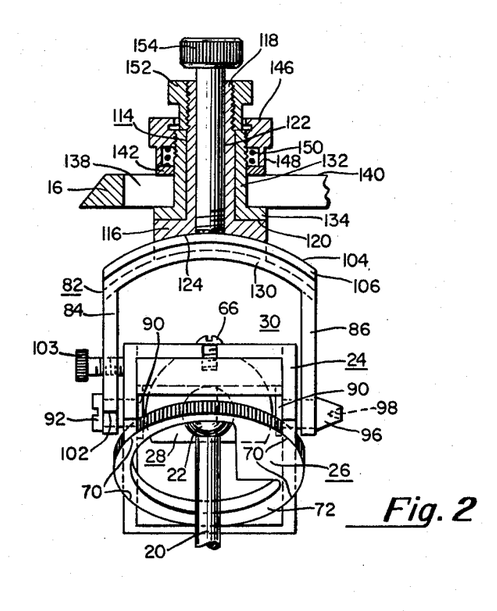
FIGURE 2 is a partial front view and a partial section of the hinge joint, as indicated by lines II—II in FIGURE 1.
Figure 3:
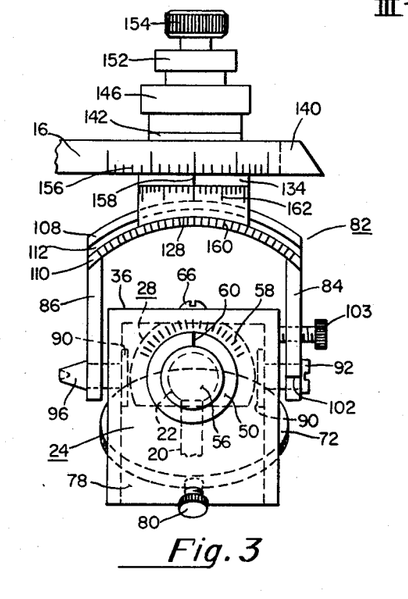
FIGURE 3 is a rear view of the hinge joint, as indicated by lines III—III in FIGURE 1.
Figure 4:
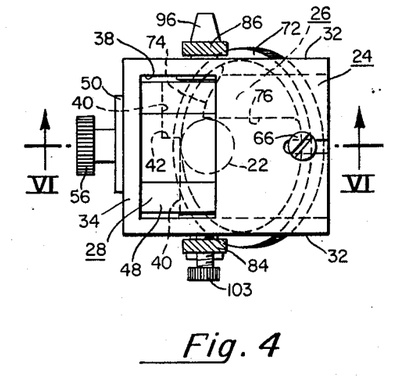
FIGURE 4 is a section on line IV—IV in FIGURE 1.
Figure 5:
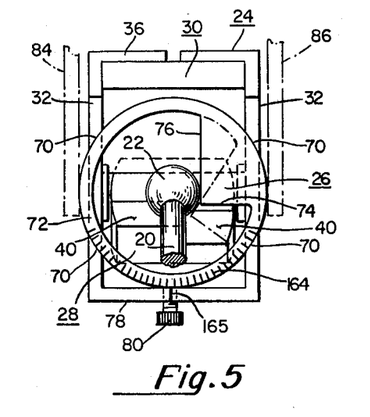
FIGURE 5 is a bottom view of the hinge joint, as indicated by lines V—V in FIGURE 1.
Figure 6:
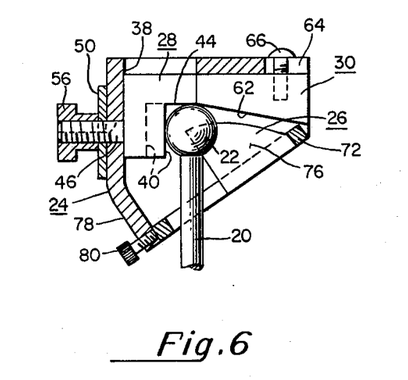
FIGURE 6 is a vertical longitudinal section on line VI—VI in FIGURE 4.
Figure 7:
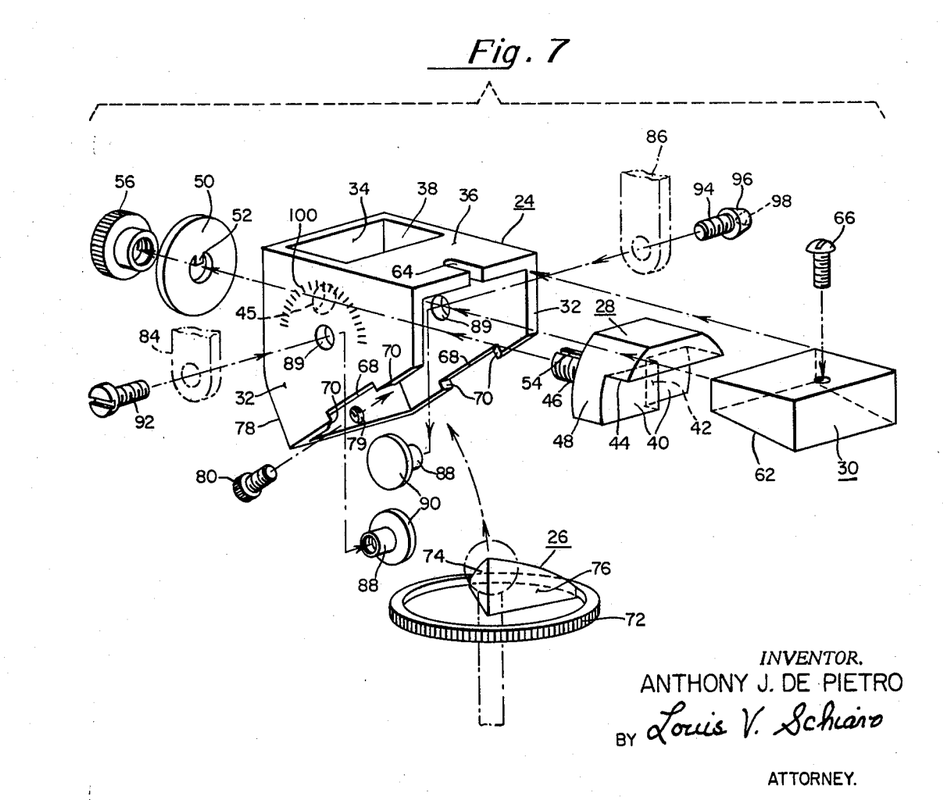
FIGURE 7 is an exploded perspective view of the lower assembly or portion of the upper hinge part.

Referring to the drawings, and particularly to the embodiment shown in FIGURES 1 to 7, my improved hinge-type joint for the dental articulator is generally upright and may extend upwardly and rearwardly at an angle of approximately 10 degrees relative to the vertical. It comprises an upper hinge part or assembly, generally designated 10, and a lower hinge part, generally designated 12. The assembly 10 includes a subassembly or condyle guide means, generally designated 14, suspended from the upper bow member 16 by means of a second subassembly, generally designated 18. The lower hinge part 12 is provided with a neck 20 terminating in a spherical element 22, and the subassembly 14 is seated upon said spherical element.

The subassembly 14 includes a frame member or jacket part 24 which mounts an abutment 26 and accommodates posterior and anterior guide parts, respectively designated 28 and 30. The jacket part 24 is provided with opposite side walls 32 joined together at the aft end of the jacket part by a wall 34, and at the top thereof by a wall 36, which extends from the fore end of the jacket part toward the aft end thereof, leaving an opening 38 for a purpose to appear. The bottom and fore end of the jacket part are open.

The posterior guide part 28 is undercut to provide the same with an inverted L-shape in transverse section. The surface 40 of the undercut is of a depth greater than the radius of the spherical element 22 and is recessed, as at 42, to provide clearance for freedom of movement of the abutment 26 about the spherical element 22. For a major portion of the lentgh of the part 28, the surface 44 of the undercut is of a width only slightly greater than the radius of the spherical element, but it increases in width at the recess 42. The surface 40 abuts the back of the spherical element 22, while the surface 44 is seated upon the top of the spherical element 22. Extending aft from the part 28 and through an opening 45 in the wall 34 of the jacket part 24 is a pivot 46, the central axis of which passes through the center of the spherical element 22. The opposite end portions of the part 28 are arcuately shaped, as at 48, for clearing the sides 32 of the jacket part when the part 28 is rocked or tilted to either side on the pivot 46. In this connection, the opening 38 is of a size to accommodate the part 28 when the latter is rocked or tilted to either side on the pivot 46. Fitted over the pivot 46 is a flat washer 50 provided with a radially inwardly extending key element 52 accommodated by a groove 54 extending longitudinally of the pivot 46. Threaded onto the pivot 46 is a nut 56 by means of which the part 28 is releasably secured in position. An arc 58 of graduations centered on the axis of the pivot 46 is inscribed upon the wall 34 of the jacket part and a coacting index mark 60 is inscribed on the washer 50.

The anterior guide part 30 is stationarily mounted in the fore end of the jacket part 24 and is thereby disposed in forward abutting relation to the part 28. The undersurface of the part 30, designated 62, is curvilinear and merges smoothly with the surface 44 of the undercut in the part 28. Extending through an open slot 64 in the fore end of the wall 36 of the jacket part 24 is a screw 66 threaded into the top of the part 30.

The lower margin areas of the walls 32 of the jacket part 24 are undercut, as at 68. The four terminal surfaces of the undercuts 68, designated 70, are arcuate, being cut concentrically and to the same radius for turnably accommodating an auxiliary guide member or annulus 72 disposed thereby in a plane extending upwardly and forwardly at an angle of approximately 45 degrees relative to the horizontal and with its central axis passing through the center of the spherical element 22. The lower hinge part 12 extends upwardly through the annulus 72. The abutment 26, formed integral with the annulus 72 extends inwardly from an arcuate section of the annulus, being bounded by surfaces 74 and 76 parallel to the central axis of the annulus and disposed at right angles to each other. The abutment extends upwardly from the annulus 72 to within a short distance of the undersurface 62 of the anterior guide part 30, and the abutment surface 76 engages the side of the spherical element 22. The lower marginal area of the wall 34 of the jacket part 24 extends downwardly and forwardly, as at 78, parallel to the central axis of the annulus 72, and threaded through an opening 79 therein is a screw 80, the inner end of which engages the annulus 72 and releasably secures it in position. The annulus 72 is selected from a set thereof, each provided with a surface 76 having a different curvature.

As noted hereinbefore, the subassembly 14 is suspended from the upper bow member 16 by means of the subassembly 18. The subassembly 18 includes a yoke part or auxiliary bracket member of inverted U-shape, generally designated 82, embracing the jacket part 24. The yoke part 82 is provided on the outer side of the jacket part with a leg 84 and on the inner side of the jacket part with a leg 86. On each side of the jacket part, a hollow pin 88 extends outwardly through an opening 89 in the wall 32 of the jacket part. A radially outwardly extending flange 90 on the inner end of the pin 88 abuts the inner surface of the wall 32 and is of an outside diameter equal to the diameter of the spherical element 22. On the outer side of the jacket part, the outer end of the pin 88 extends through the lower extremity of the yoke leg 84, and threaded into the outer end of the pin 88 is a screw 92. On the inner side of the jacket part, the outer end of the pin 88 extends through the lower extremity of the yoke leg 86, and threaded into the outer end of the pin 88 is a screw 94 with a head 96 provided with an axial depression 98 for the reception of a face bow pin. The pins 88 are coaxial and their axis passes through the center of the spherical element 22. An arc 100 of graduations centered on the axis of the pins 88 is inscribed on the outer wall 32 of the jacket part, and coacting index marks 102 are provided on the yoke leg 84. Threaded through the leg 84 is a lock screw 103 which frictionally engages the wall 32 of the jacket part 24. The upper periphery of the yoke part 82 is arcuate, as at 104, and is provided with a pair of opposite side flanges 106 and 108. On the aft side of the hinge joint the yoke part is provided with an arcuate rib 110 radially spaced inwardly from the flange 108 to form between the flange 108 and the rib 110 an arcuate groove 112.

Overlying the yoke part 82 is a yoke mounting part or principal bracket member, generally designated 114, provided with a cylindrical body 116 from which a hollow stem 118 extends upwardly. At the juncture of the body 116 and the stem 118 is an annular shoulder 120. The hollow interior of the stem 118, designated 122, communicates with an underlying arcuate recess 124 which is T-shaped in transverse section. On one side of the recess 124 the cylindrical body 116 is provided with an arcuate undersurface 126. On the opposite side of the recess 124 the cylindrical body 116 is provided with an arcuate undersurface 128. The leg connecting part of the yoke 82, designated 130, is arcuate in shape and slidably fitted into the arcuate recess 124, as shown.

The stem 118 of the yoke mounting part 114 extends through a sleeve 132 which is provided with a radially outwardly extending flange 134 at the lower extremity thereof. Diametrically opposite sides of the sleeve 132 are flat, as at 136, and the sleeve extends upwardly freely through an elongated opening 138 formed in a wing 140 of the upper bow member 16 of the instrument.

Fitted over the sleeve 132 is a flat washer 142 and a coil compression spring 150. Threaded upon the upper end of the sleeve is a lock nut 146 provided with a hollow cylindrical apron 148 housing the compression spring 150 and seated upon the washer 142. Threaded upon the upper end of the stem 118 is a lock nut 152 which engages with the upper end of the sleeve 132. A lock screw 154 extends freely through the major portion of the stem 118 and is threaded into the lower end portion of the stem for engagement with the arcuate surface 104 of the yoke part 82.

The axis of the lock screw 154 passes through the center of the spherical element 22, and the center of curvature of the arcuate recess 124 in the yoke mounting part 114 and of the arcuate leg connecting portion 130 of the yoke part 82 slidably fitted in the recess 124 is at the center of the spherical element 22.

As described and shown, no component part of the upper hinge part 10 is movable relative to the upper bow member 16. In other words, the upper hinge part 10 is effectively locked in position.

The lock screw 103 engaging the wall 32 of the jacket part 24 frictionally secures or locks the lower subassembly 14 against pivotal movement as a unit about the axis of the pins 88. The lock screw 154 engages the yoke part 82 and urges it downwardly relative to the yoke mounting part 114, in consequence of which the yoke part 82 is frictionally secured or locked against tilting movement to either side relative to the yoke mounting part 114. The lock nut 152 draws the shoulder 120 of yoke mounting part 114 upwardly against the flange 134 of the sleeve 132, in consequence of which the yoke mounting part 114 is secured or locked against movement relative to the sleeve 132. The sleeve 132 cannot turn about its longitudinal axis relative to the upper bow member because its flat diametrically opposite sides 136 fit snugly between the opposite sides of the elongated opening 138. The lock nut 146 draws the flange 134 of sleeve 132 upwardly against the bottom of the wing 140 of the bow member 16, in consequence of which the sleeve 132 is secured or locked against movement longitudinally of the elongated opening 138.

In order to suitably adjust the instrument and effectively lock it in adjusted position, the lower hinge part 12 is moved to the desired position laterally of the instrument. Then the nut 146 is loosened, whereupon the spring 150 acts to secure the sleeve 132 against moving axially downwardly relative to the bow member 16. The hinge part 10 is moved as a unit laterally of the instrument to bring the abutment surface 76 into engagement with the inner side of the spherical element 22. To aid in positioning the hinge part 10 laterally of the instrument a suitable scale 156 is inscribed on the back of the wing 140 of the upper bow member 16 and an index mark 158 is inscribed on the flange 134 of the sleeve 132. With the hinge part 10 in the adjusted position, the lock nut 146 is retightened against the influence of the coil spring 150.

Now the lock screw 103 is loosened and the subassembly 14 is tilted about the axis of the pins 88 fore and aft to the desired position. The graduations 100 and coacting index marks 102 aid in adjusting the subassembly 14. With the subassembly 14 in the adjusted position, the screw 103 is retightened.

Now the lock screw 154 is loosened and the subassembly 14 and yoke part 82 are tilted laterally of the instrument as a unit to the desired position, the movement being, of course, about the center of the spherical element 22. Suitable markings, indicated at 160, are provided to aid in making the adjustment. With the subassembly 14 and yoke part 82 in the desired tilted position, the lock screw 154 is retightened.

Now the lock nut 152 is loosened and the yoke mounting part 114 is turned in sleeve 132 to the desired position. The yoke part 82 and the subassembly 14 turn with the yoke mounting part 114 as a unit. Suitable graduations, indicated at 162, are provided to aid with this adjusmtent. With the yoke mounting part 114 in the adjusted position, the lock nut 152 is retightened.

Now the screw 80 is loosened, and the annulus 72 is turned about its central axis until the abutment surface 76 is positioned as desired about the spherical element 22. Suitable markings, indicated at 164, and an index mark 165 are provided to aid with this adjustment. With the abutment surface in the adjusted position, the screw 80 is retightened.

By loosening the lock screws 154 and 103 and then suitably adjusting the yoke part 82 and subassembly 14, the central axis of the annulus 72 may be brought into coaxial relation to the generally upright axis of the hinge joint. Then by loosening the screw 80, the abutment surface 76 may be turned about the said generally upright axis, with the abutment surface 76 engaging the side of the spherical element 22.

Now the nut 56 is loosened, and the posterior guide part 28 turned about the axis of the pivot 46 to the desired position. The graduations 58 and index mark 60 aid in this adjustment. With the part 28 in the adjusted position, the nut 56 is retightened.

It is to be noted that the hinge part 10 may be unlocked for effecting any one of the several adjustments aforesaid without making it possible to disturb any previously made adjustment. In other words, when one of the locking elements is loosened, only one adjustment is possible. Each adjustment is made entirely independently of the others, and the adjustments may be made in any order.

When the instrument is properly adjusted, the upper and lower bow members may be opened and closed and shifted relative to one another fore and aft and laterally with the inner side of the spherical element 22 always engaged with the abutment surface 76 of the abutment 26 and with the top of the spherical element 22 always engaged with the condylar guide surface.

The anterior guide part 30 is only one of a set thereof, preferably made of a plastic material, each provided with an undersurface having a different curvature. The selected anterior guide part is inserted into and removed from the jacket part 24 through the open fore end thereof. It is removably secured in position by the screw 66.

Figure 8:
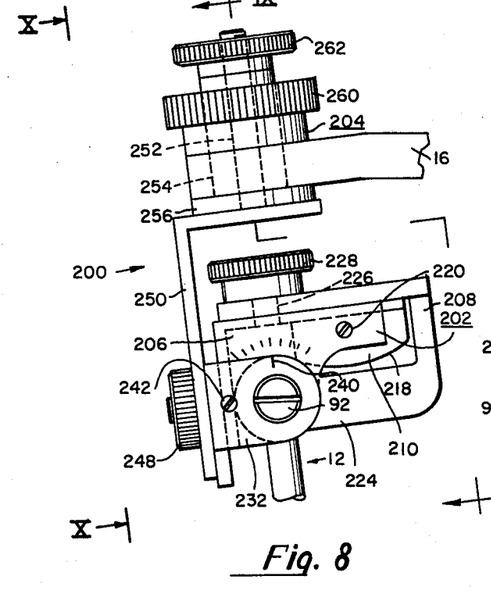
FIGURE 8 is a side view of a modified hinge joint constructed in accordance with the invention.
Figure 9:
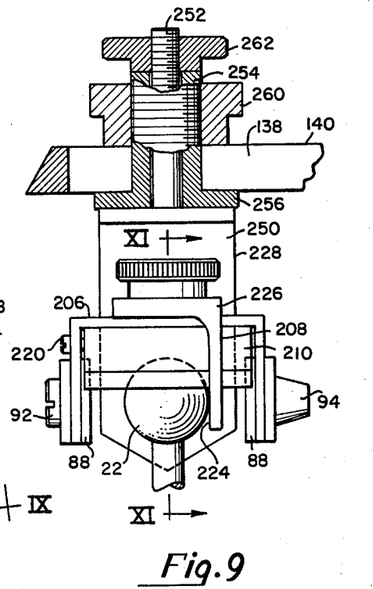
FIGURE 9 is a partial front view and a partial section of the hinge joint, as indicated by lines IX—IX in FIGURE 8.
Figure 10:
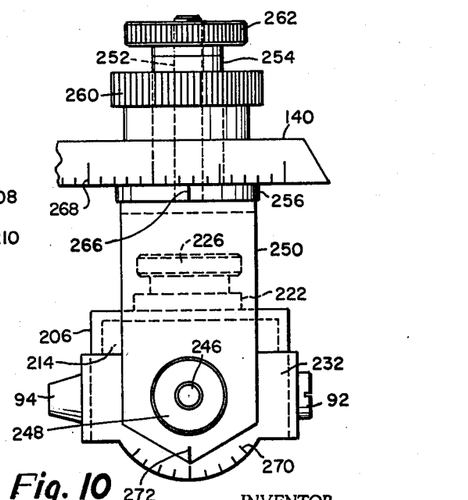
FIGURE 10 is a rear view of the hinge joint, as indicated by lines X—X in FIGURE 8.
Figure 11:
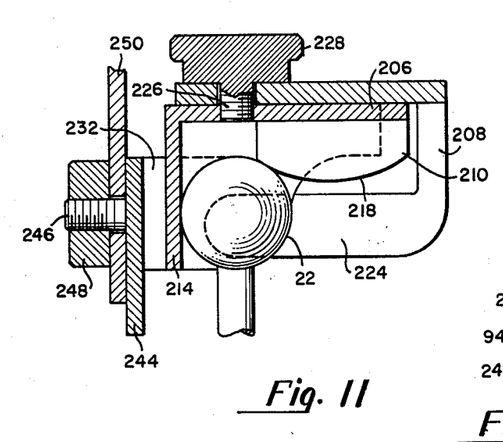
FIGURE 11 is a section on line XI—XI in FIGURE 9.
Figure 12:
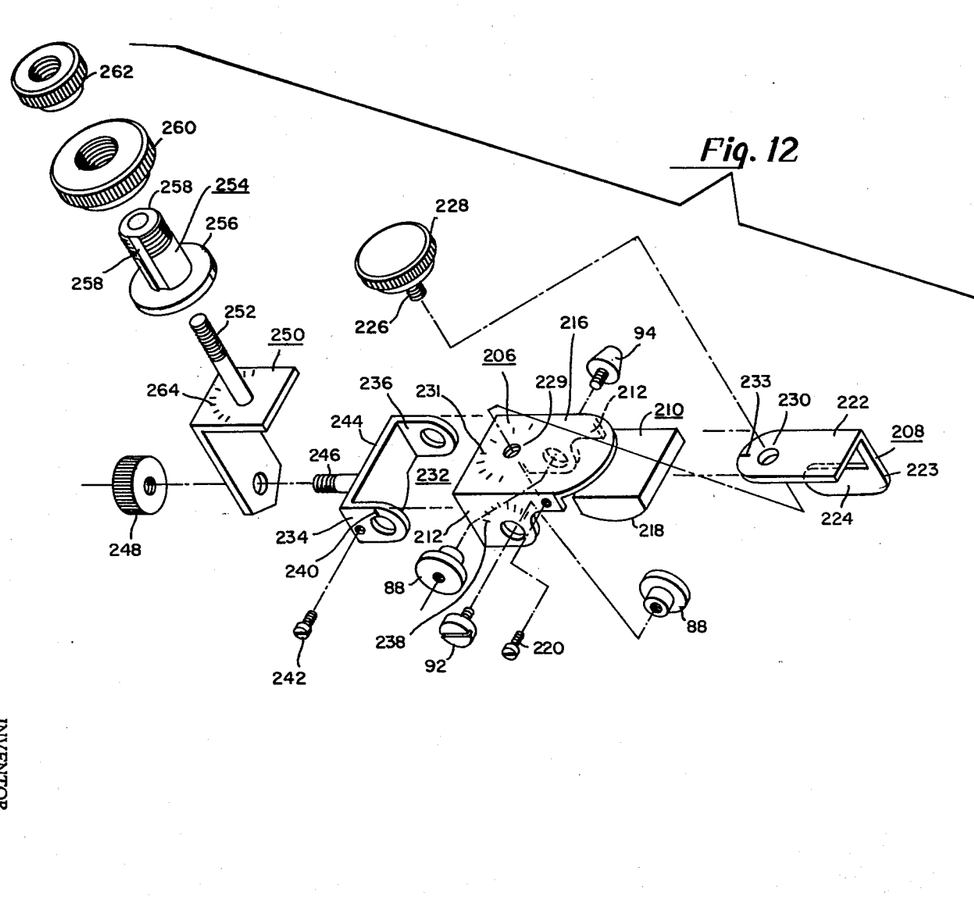
FIGURE 12 is an exploded perspective view of the lower assembly or portion of the upper hinge part shown in FIGURE 8.

Now referring particularly to the embodiment of FIGURES 8–12, the joint for the dental articulator is provided with a modified upper hinge part or assembly, generally designated 200. The assembly 200 includes a subassembly or condyle guide means, generally designated 202, suspended from the upper bow member 16 by means of a second subassembly, generally designated 204. The subassembly 202 is seated upon the spherical element or head 22 of the lower hinge part 12.

The subassembly 202 includes a frame member or jacket part 206 which mounts an abutment member 208 and accommodates a guide part 210. The jacket part 206 is provided with opposite side walls 212 joined together at the aft end of the jacket part by a wall 214, and at the top thereof by a wall 216. The bottom and fore end of the jacket part are open.

The guide part 210 is stationarily mounted in the fore end of the jacket part 206 with its curvilinear undersurface, designated 218 engaging the spherical element 22. Threaded through one of the walls 212 is a screw 220 operative to press the guide part 210 against the other wall 212, whereby to hold the guide part 210 in position.

The abutment member 208 comprises an upper arm 222 overlying the wall 216 of the jacket part 206. Depending from the fore end of the arm 222 is an arm 223 provided with an abutment surface 224 abutting one side of the spherical element 22. A screw 226 provided with an enlarged head 228 extends freely through a hole 230 in the arm 222 and is threaded into the wall 216, as at 229, to hold the abutment member 208 in an adjusted position relative to the jacket part 206 and guide part 210. An arc 231 of graduations centered on the axis of the screw 226 is inscribed on the wall 216 of the jacket 206, and a coacting index mark 233 is provided on the upper arm 222 of the abutment member 208. The axis of the screw 226 passes through the center of the spherical element 22. The abutment member 208 is selected from a set thereof, each provided with an abutment surface 224 having a different curvature.

As noted hereinbefore, the subassembly 202 is suspended from the upper bow member 16 by means of the subassembly 204. The subassembly 204 includes a yoke part or auxiliary bracket member, generally designated 232, embracing the jacket part 206. The yoke part 232 is provided with a pair of legs 234 and 236 respectively on the outer and inner sides of the jacket part. Connection of legs 234 and 236 to the jacket part 206 is effected in the same manner as connection of legs 84 and 86 to jacket part 24 is effected in the embodiment of FIGURES 1–7, i.e., by pins 88 and screws 92 and 94, as shown. As in the embodiment of FIGURES 1–7, the pins 88 are coaxial and their axis passes through the center of the spherical element 22. An arc 238 of graduations centered on the axis of the pins 88 is inscribed on the outer wall 212 of the jacket part, and a coacting index mark 240 is provided on the yoke leg 234. Threaded through the leg 234 is a lock screw 242 which frictionally engages the wall 212 of the jacket part. The yoke legs 234 and 236 are connected by a part 244, which mounts a rearwardly extending stud 246 upon which a lock nut 248 is threaded. The axis of the stud 246 passes through the center of the spherical element 22.

The stud 246 extends freely through one leg of a yoke mounting part or principal bracket member, generally designated 250, of inverted L shape. Extending upwardly from the other leg is a stud 252 which passes freely through a sleeve 254 that is provided with a radially outwardly extending flange 256 at the lower extremity thereof. Diametrically opposite sides of the sleeve 254 are flat, as at 258, and the sleeve extends upwardly freely through the opening 138 formed in the wing 140 of the upper bow member 16 of the instrument. Threaded upon the sleeve 254 is a lock nut 260, and threaded upon the stud 252 is a lock nut 262. The axis of the stud 252 extends through the center of the spherical element 22. An arc 264 of graduations centered on the axis of the stud 252 is inscribed on the yoke mounting part 250, and a coacting index mark 266 is provided on the flange 256 of the sleeve 254.

As described and shown, no component part of the upper hinge part 200 is movable relative to the upper bow member 16. In other words, the upper hinge part 200 is effectively locked in position.

The lock screw 242 engaging the wall 212 of the jacket part 206 frictionally secures or locks the lower subassembly 202 against pivotal movement as a unit about the axis of the pins 88. The lower extremity of the yoke mounting part 250 is clamped between the part 244 of the yoke part 232 and the lock nut 248, in consequence of which the yoke part 232 is frictionally secured or locked against tilting movement to either side about the axis of the stud 246. The lock nut 262 draws the yoke mounting part 250 up against the flange 256 of the sleeve 254. Thus the yoke mounting part 250 is frictionally secured against movement relative to the sleeve 254. The sleeve 254 cannot turn about its longitudinal axis relative to the upper bow member because its flat diametrically opposite sides 258 fit snugly between the opposite sides of the elongated opening 138. The lock nut 260 draws the flange 256 of the sleeve 254 upwardly against the bottom of the wing 140 of the bow member 16, in consequence of which the sleeve 254 is secured or locked against movement longitudinally of the elongated opening 138.

In order to adjust the instrument and effectively lock it in adjusted position, the lower hinge part 12 is moved to the desired position laterally of the instrument. Then the nut 260 is loosened, whereupon the hinge part 200 is moved as a unit laterally of the instrument to bring the abutment surface 224 into engagement with the inner side of the spherical element 22. A scale 268 inscribed on the back of the wing 140 of the upper bow member 16 and the index mark 266 inscribed on the flange 256 of the sleeve 254 aid in positioning the hinge part 200. With the hinge part 200 in the adjusted position, the nut 260 is retightened.

Now the lock screw 242 is turned out slightly and the subassembly 202 is tilted about the axis of the pins 88 fore and aft to the desired position. The graduations 238 and coacting index marks 240 aid in adjusting the subassembly 202. With the subassembly 202 in the adjusted position, the screw 242 is turned in again.

Now the lock nut 248 is loosened and the subassembly 202 and yoke part 232 are tilted laterally of the instrument as a unit to the desired position, the movement being, of course, about the center of the stud 246. Suitable markings, indicated at 270, and an index mark 272, are provided to aid in making the adjustment. With the subassembly 202 and the yoke part 232 in the desired tilted position, the lock nut 248 is retightened.

Now the lock nut 262 is loosened and the yoke mounting part 250 is turned in sleeve 254 to the desired position. The yoke part 232 and the subassembly 202 turn with the yoke mounting part 250 as a unit. The graduations 264 and the index mark 266 are provided to aid with this adjustment. With the yoke mounting part 250 in the adjusted position, the lock nut 262 is retightened.

Now the screw 226 is loosened, and the abutment member 208 is positioned as desired with the abutment surface 224 engaging the spherical element 22. The graduations 231 on the wall 216 of the jacket part 206 and the index mark 233 on the arm 222 of the abutment member 208 aid in positioning the abutment member 208. With the abutment member in the adjusted position thereof, the screw 226 is retightened.

It is to be noted that, as in the embodiment of FIGURES 1-7, the hinge part 200 may be unlocked for effecting any one of the several adjustments aforesaid without making it possible to disturb any previously made adjustment. In other words, when one of the locking elements is loosened, only one adjustment is possible. Each adjustment is made entirely independently of the others, and the adjustments may be made in any order.

As in the embodiment of FIGURES 1-7, when the instrument is properly adjusted, the upper and lower bow members may be opened and closed and shifted relative to one another fore and aft and laterally with the inner side of the spherical element 22 always engaged with the abutment surface 224 and with the top of the spherical element 22 always engaged with the condylar guide surface 218.

As in the embodiment of FIGURES 1-7, the guide part 210 is only one of a set thereof, preferably made of plastic material, each provided with an undersurface having a different curvature. The selected guide part is inserted into and removed from the jacket part 206 through the open fore end thereof. It is removably secured in position by the screw 220.

Figure 13:
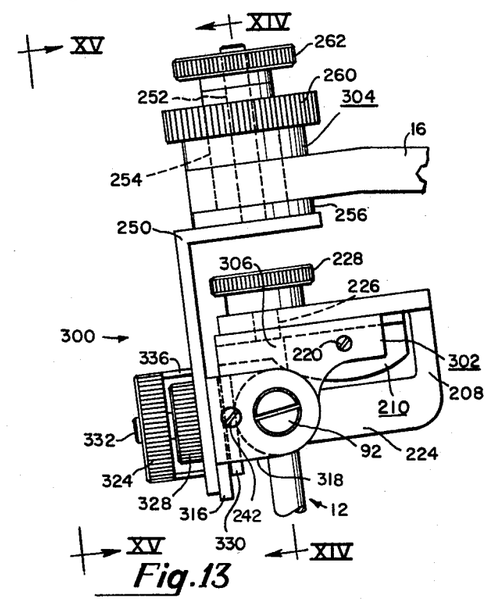
FIGURE 13 is a side view of another modified hinge joint constructed in accordance with the invention.
Figure 14:
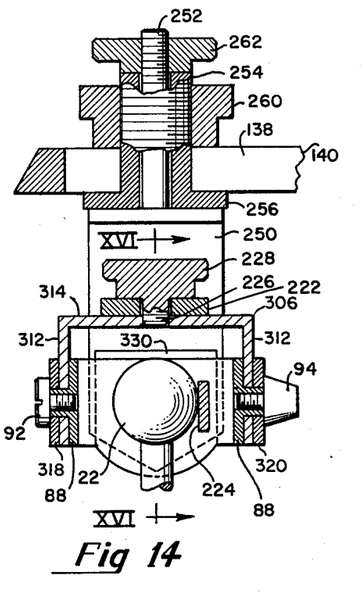
FIGURE 14 is a section on line XIV—XIV in FIGURE 13.
Figure 15:
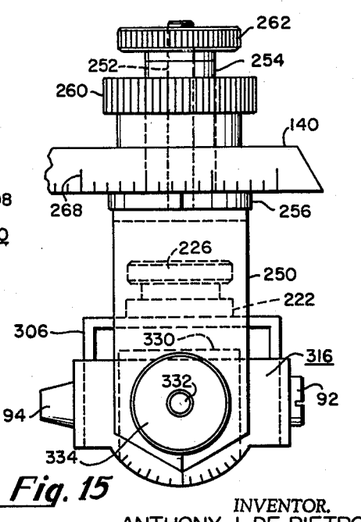
FIGURE 15 is a rear view of the hinge joint, as indicated by lines XV—XV in FIGURE 13.
Figure 16:
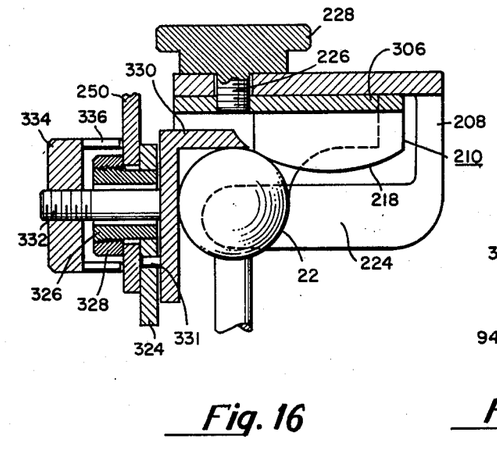
FIGURE 16 is a section on line XVI—XVI in FIGURE 14.
Figure 17:
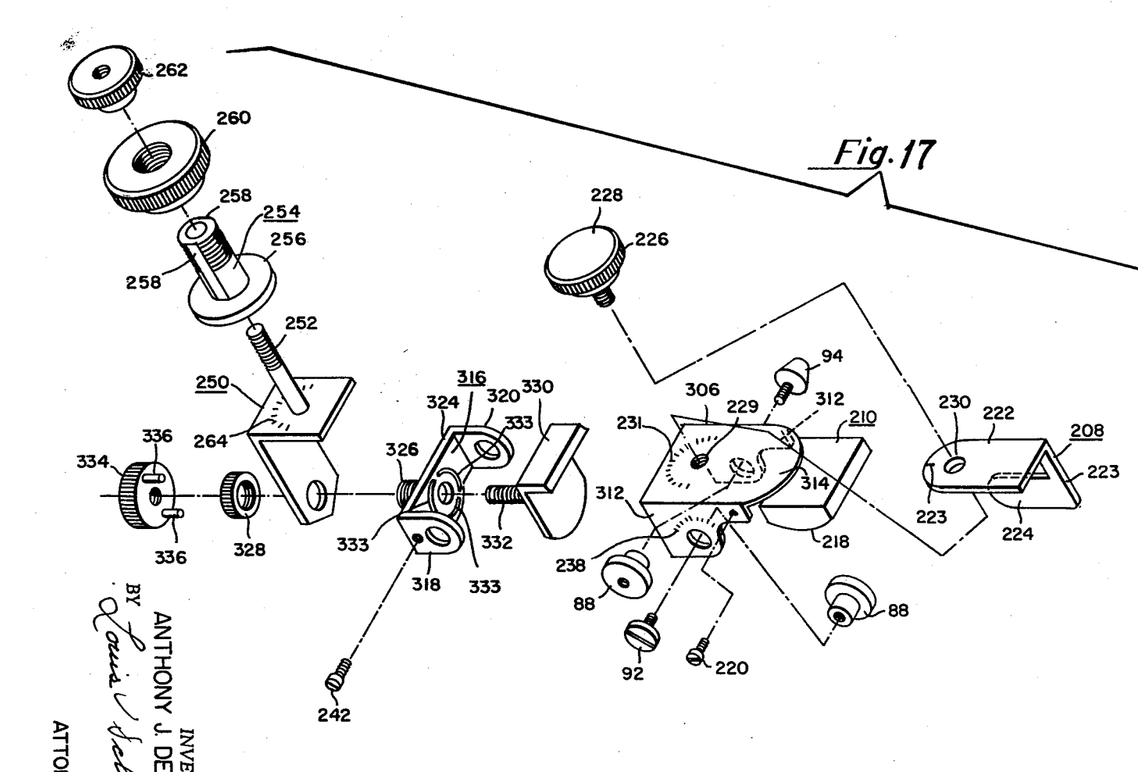
FIGURE 17 is an exploded perspective view of the lower assembly or portion of the upper hinge part shown in FIGURE 13.

Now referring particularly to the embodiment of FIGURES 13-17, the joint for the dental articulator is provided with another modified upper hinge part or assembly, generally designated 300. The assembly 300 includes a subassembly or condyle guide means, generally designated 302, suspended from the upper bow member 16 by means of a second subassembly, generally designated 304. The subassembly 302 is seated upon the spherical element or head 22 of the lower hinge part 12.

The subassembly 302 includes a frame member or jacket part 306 which mounts the abutment member 208 and accommodates an anterior guide part 210. The jacket part 306 is of inverted U-shape, being provided with opposite side walls 312 joined together at the tops thereof by a wall 314. The bottom and aft and fore ends of the jacket part are open.

The jacket part 306 accommodates the guide part 210 in the same manner as the jacket part 206 accommodates the guide part 210. The curvilinear undersurface 218 of the guide part 210 engages the spherical element 22. The jacket part 306 also mounts the abutment member 208 in the same manner as the jacket part 206 mounts the abutment member 208. The axis of the screw 226 passes through the center of the spherical element 22, and the abutment surface 224 of the abutment member 208 engages the spherical element 22.

As noted hereinbefore, the subassembly 302 is suspended from the upper bow member 16 by means of the subassembly 304. The subassembly 304 includes a yoke part or auxiliary bracket member, generally designated 316, embracing the jacket part 306. The yoke part 316 is provided with a pair of legs 318 and 320 respectively on the outer and inner sides of the jacket part. Connection of the legs 318 and 320 to the jacket part 306 is effected by means of pins 88 and screws 92 and 94, as indicated hereinbefore in connection with the embodiment of FIGURES 8-12. The pins 88 are coaxial and their axis passes through the center of the spherical element 22. The lock screw 242 is threaded through the leg 318 of the yoke part 316.

The yoke legs 318 and 320 are connected by a part 324, which mounts a tubular element 326 extending rearwardly freely through the upright leg of the yoke mounting part or principal bracket member 250. Threaded upon the element 326 is a lock nut 328 bearing on the bracket member 250, as shown.

Disposed between the legs 318 and 320 of the yoke part 316 is a posterior guide part 330 of inverted L-shaped in transverse section. The upright leg of the part 330 is disposed between the part 324 of the yoke part 316 and the spherical element 22 while the other leg extends forwardly and is seated upon the top of the spherical element 22. The foremost edge of this leg extends forwardly slightly beyond the center of the spherical element 22, as shown. Extending from the upright leg of the part 330 are a set of three pins 331 each projecting through an arcuate slot 333 in the part 324 of the yoke part 316 and bearing on the bracket member 250, as shown. The length of these pins is slightly greater than the thickness of the part 324 of the yoke part 316. A stud 332 extends rearwardly from the upright leg of the part 330 freely through the element 326. The axis of the stud 332 passes through the center of the spherical element 22. Threaded onto the stud 332 is a lock nut 334 provided with a pair of diametrically opposite axially extending elements 336 bearing on the bracket member 250, as shown.

The subassembly 302, yoke part 316 and posterior guide part 330 are carried by the principal bracket member 250 connected to the upper bow member 16 in the manner indicated hereinbefore in connection with the embodiment of FIGURES 8-12, i.e., by means of stud 252, sleeve 254 and lock nuts 260 and 262. The axis of the stud 252 passes through the center of the spherical element 22.

In order to adjust the instrument and effectively lock it in adjusted position, the lower hinge part 12 is moved to the desired position laterally of the instrument. Then the hinge part 300 is moved as a unit laterally of the instrument to bring the abutment surface 224 into engagement with the inner side of the spherical element 22, as described in connection with the embodiment of FIGURES 8-12.

Now the subassembly 302 is released by turning out the lock screw 242 slightly, tilted about the axis of the pins 88 fore and aft to the desired position, and then locked in adjusted position by turning the lock screw 242 back in again. Suitable graduations and index marks (not shown) are provided to aid in adjusting the subassembly 302.

Now the lock nut 328 is loosened and the subassembly 302 and yoke part 316 are tilted laterally of the instrument as a unit to the desired position, the movement being, of course, about the axis of the tubular element 326, and then locked in adjusted position by tightening the lock nut 328 again. Suitable graduations and an index mark (not shown) are provided to aid in adjusting the subassembly 302 and yoke part 316.

Now the lock nut 334 is loosened and the posterior guide part 330 is tilted laterally of the instrument to the desired position, the movement being, of course, about the axis of the stud 332, and then locked in adjusted position by tightening the lock nut 334 again.

It is to be noted that, as in the embodiments of FIGURES 1-7 and 8-12, the hinge part 300 may be unlocked for effecting any one of the several adjustments aforesaid without making it possible to disturb any previously made adjustment. In other words, when one of the locking elements is loosened, only one adjustment is possible. Each adjustment is made entirely independently of the others, and the adjustments may be made in any order.

As in the embodiments of FIGURES 1-7 and 8-12, when the instrument is properly adjusted, the upper and lower bow members may be opened and closed and shifted relative to one another fore and aft and laterally with the inner side of the spherical element 22 always engaged with the abutment surface 224 and with the top of the spherical element 22 always engaged with the condylar guide surface 218.

As in the embodiments of FIGURES 1-7 and 8-12, the guide part 210 is only one of a set thereof, preferably made of plastic material, each provided with an undersurface having a different curvature. The selected guide part is inserted into and removed from the jacket part 306 through the open fore end thereof. It is removably secured in position by the screw 220.

As in the embodiments of FIGURES 1-7 and 8-12, the abutment member 208 is only one of a set thereof, each provided with an abutment surface 224 having a different curvature.

What is claimed is:
1. In a dental articulator, the combination comprising
(A) a lower bow member,
(B) an upper bow member, and
(C) a pair of laterally spaced hinge-type joints for mounting said upper bow member upon said lower bow member each including
(1) a hinge part in the form of a spherical element carried by said lower bow member, and
(2) a hinge part carried by said upper bow member including an assembly having
(a) an anterior guide part with a condylar guide surface area extending fore and aft,
(b) a posterior guide part with a condylar guide surface area to the rear of the condylar guide surface area of said anterior guide part and adjustably fixed relative to said anterior guide part against movement about an axis extending through the center of said spherical element,
(c) an abutment engaging said spherical element and mounted for being turned about an axis extending through the center of said spherical element, and
(d) means for mounting said assembly for movement as a unit about the center of said spherical element.

2. The combination according to claim 1 wherein the abutment is disposed in an upright position, the condylar guide surface area of the posterior guide part extends downwardly as well as rearwardly from the condylar guide surface area of the anterior guide part, said abutment and rearwardly and downwardly extending condylar guide surface area of the posterior guide part remain constantly engaged with the spherical element when said abutment is turned about said sperical element, when said posterior guide part is tilted to either side relative to said anterior guide part, and when the assembly is moved as a unit about said spherical element.

3. The combination according to claim 2 wherein the assembly includes a jacket part, the posterior guide part is rockably mounted in said jacket part, the anterior guide part is stationarily mounted in said jacket part, and the abutment is carried by an annulus turnably mounted upon said jacket part.

4. The combination according to claim 3 wherein the jacket part extends rearwardly along one side, around the back and forwardly along the opposite side of the spherical element, the posterior guide part extends upwardly between the back of said jacket and said spherical element and over the top of said spherical element and is provided with a pivot extending into the back of said jacket part, the annulus is disposed in lower spaced relation to said spherical element, and the abutment extends upwardly from said annulus.

5. The combination according to claim 3 wherein the jacket part extends rearwardly along one side, around the back and forwardly along the opposite side of the spherical element, the diameter of the annulus is greater than the width of the jacket, lower marginal areas of the jacket are recessed for turnably receiving the annulus, the annulus being thus disposed in lower spaced relation to the spherical element in a plane extending forwardly and upwardly, and the abutment extends upwardly from the annulus.

6. The combination according to claim 3 wherein the spherical element is mounted upon a neck extending upwardly freely through the annulus, the annulus is disposed in lower spaced relation to the spherical element in a plane extending forwardly and upwardly, and the abutment extends upwardly from the annulus.

7. The combination according to claim 3 wherein the posterior guide part is undercut to provide condylar guide surface areas at right angles to each other, one of said surface areas being engaged with the back of the spherical element and the other being seated upon the top of the spherical element and being smoothly merged with the condylar guide surface area of the anterior guide part.

8. The combination according to claim 3 wherein the means for mounting the assembly for movement as a unit about the center of the spherical element includes a yoke part depending therefrom and embracing the jacket part, the jacket part is carried by the yoke part and mounted for rocking about a generally horizontal axis extending transversely through the center of the spherical element, each of said jacket and posterior guide parts is angularly adjustable about its pivotal axis, said annulus is angularly adjustable about its central axis, and means is provided for releasably securing each of said jacket and posterior guide parts and annulus in a selected position thereof.

9. In a dental articulator, the combination comprising
 (A) a lower bow member,
 (B) an upper bow member, and
 (C) a pair of laterally spaced hinged-type joints for mounting said upper bow member upon said lower bow member each including
  (1) a hinge part in the form of a spherical element carried by said lower bow member, and
  (2) a hinge part carried by said upper bow member including
   (a) a principal bracket member mounted upon said upper bow member for being adjustably fixed in a selected position,
   (b) an auxiliary bracket member mounted upon said principal bracket member for being adjustably fixed in a selected position angularly about a first generally horizontal axis,
   (c) condyle guide means mounted upon said auxiliary bracket for being adjustably fixed in a selected position angularly about a second generally horizontal axis including a frame member carrying a downwardly facing condylar guide surface extending fore and aft and resting upon said spherical element, and
   (d) an auxiliary guide member mounted upon said frame member for being adjustably fixed in a selected position relative thereto angularly about a generally upright axis, said member being provided with a face abutting the side of said spherical element, and the several generally upright and horizontal axes being disposed at right angles each to the others with each passing through the center of said spherical element.

10. The combination according to claim 9 wherein the principal bracket member is provided with a depending arm disopsed to the rear of the spherical element, and the auxiliary bracket member is mounted upon said depending arm and extends forwardly therefrom for connection to the frame member.

11. The combination according to claim 10 wherein the auxiliary bracket member is provided with laterally spaced arms disposed respectively on opposite sides of the spherical element, and the frame member is provided with a base wall disposed above said spherical element and opposite side walls depending therefrom and mounted respectively upon the arms of said auxiliary bracket member for being adjustably fixed in a selected position angularly about the second generally horizontal axis.

12. The combination according to claim 11 wherein the frame member is disposed between the arms of the auxiliary bracket member, and a pair of protuberances corresponding to one of the spherical elements in diameter and disposed respectively on opposite sides thereof extend inwardly respectively from the inner faces of the side walls of said frame member in concentric relation to the second generally horizontal axis.

13. The combination according to claim 9 wherein the condylar guide surface is the curvilinear undersurface of a guide member selected from a group thereof and mounted in said frame member for being detached therefrom and replaced by any other seletced one of said guide members.

14. The combination according to claim 12 wherein the condylar guide surface is the curvilinear undersurface of a guide member mounted in said frame member, said guide surface being of a width for engaging the spherical element and the protuberances respectively on opposite sides thereof.

15. The combination according ot claim 9 wherein the principal bracket member is provided with a depending arm disposed to the rear of the spherical element, the auxiliary bracket member is mounted upon said depending arm and extends forwardly therefrom for connection to the frame member, and the frame member is mounted upon said auxiliary bracket member for being adjustably fixed in a selected position angularly about the second generally horizontal axis, said frame member being provided with a base wall disposed above said spherical element, and with a wall depending from said base wall and disposed to the rear of said spherical element for engaging the same.

16. The combination according to claim 15 wherein the frame member is provided with opposite side walls depending from the base wall, and the condyle guide surface is the curvilinear undersurface of a guide member selected from a group thereof and mounted under said base wall and between said opposite side walls for being detached from said frame and replaced by any other selected one of said guide members.

17. The combination according to claim 9 wherein the frame member is provided with a base wall disposed above the spherical element, the condyle guide surface is the curvilinear undersurface of a guide member selected from a group thereof and mounted under said base wall, and the guide member mounted upon the frame member for being adjustably fixed in a selected position relative thereto extends forwardly over said base wall, down around the fore end thereof and back under said condyle guide surface for engagement with the side of the spherical element.

18. The combination according to claim 9 wherein the principal bracket member is provided with a depending arm disposed to the rear of the spherical element, the auxiliary bracket member is mounted upon said depending arm and extends forwardly therefrom for connection to the frame member, the frame member is mounted upon said auxiliary bracket member for being adjustably fixed in a selected position angularly about the second generally horizontal axis, said frame member being provided with a base wall disposed above said spherical element, and the condyle guide means includes a member resting upon said spherical element and engaging the rear thereof, said member being mounted for being adjustably fixed in a selected position angularly relative to said auxiliary bracket member about the first generally horizontal axis.

19. The combination according to claim 9 wherein the principal bracket member is provided with a depending arm disposed to the rear of the spherical element, the auxiliary bracket member is provided with laterally spaced arms disposed respectively on opposite sides of the spherical element, the frame member is provided with a base wall disposed above said spherical element and opposite side walls depending therefrom and mounted respectively upon the arms of said auxiliary bracket member for being adjustably fixed in a selected position angularly about the second generally horizontal axis, and the condyle guide means includes a member disposed between the arms of said auxiliary frame member and resting upon said spherical element and engaging the rear thereof, said member being mounted for being adjustably fixed in a selected position angularly relative to said auxiliary bracket member about the first generally horizontal axis.

20. The combination according to claim 18 wherein the auxiliary bracket member is provided with a first pivot element extending rearwardly through the depending arm of the principal bracket member, the member mounted for being adjustably fixed in a selected position relative to said auxiliary bracket member is provided with a second pivot element extending rearwardly through said first pivot element, and nuts are threaded upon said pivot elements whereby to draw the members carried thereby to said principal bracket member.

References Cited
UNITED STATES PATENTS

| | | | |
|---|---|---|---|
| 3,019,530 | 2/1962 | De Pietro | 32—32 |
| 3,176,400 | 4/1965 | De Pietro | 32—32 |
| 3,224,096 | 12/1965 | Stuart | 32—32 |

ROBERT PESHOCK, Primary Examiner